May 27, 1952 P. E. NOLL ET AL 2,598,590
CONTROL VALVE
Original Filed May 10, 1946 7 Sheets-Sheet 3

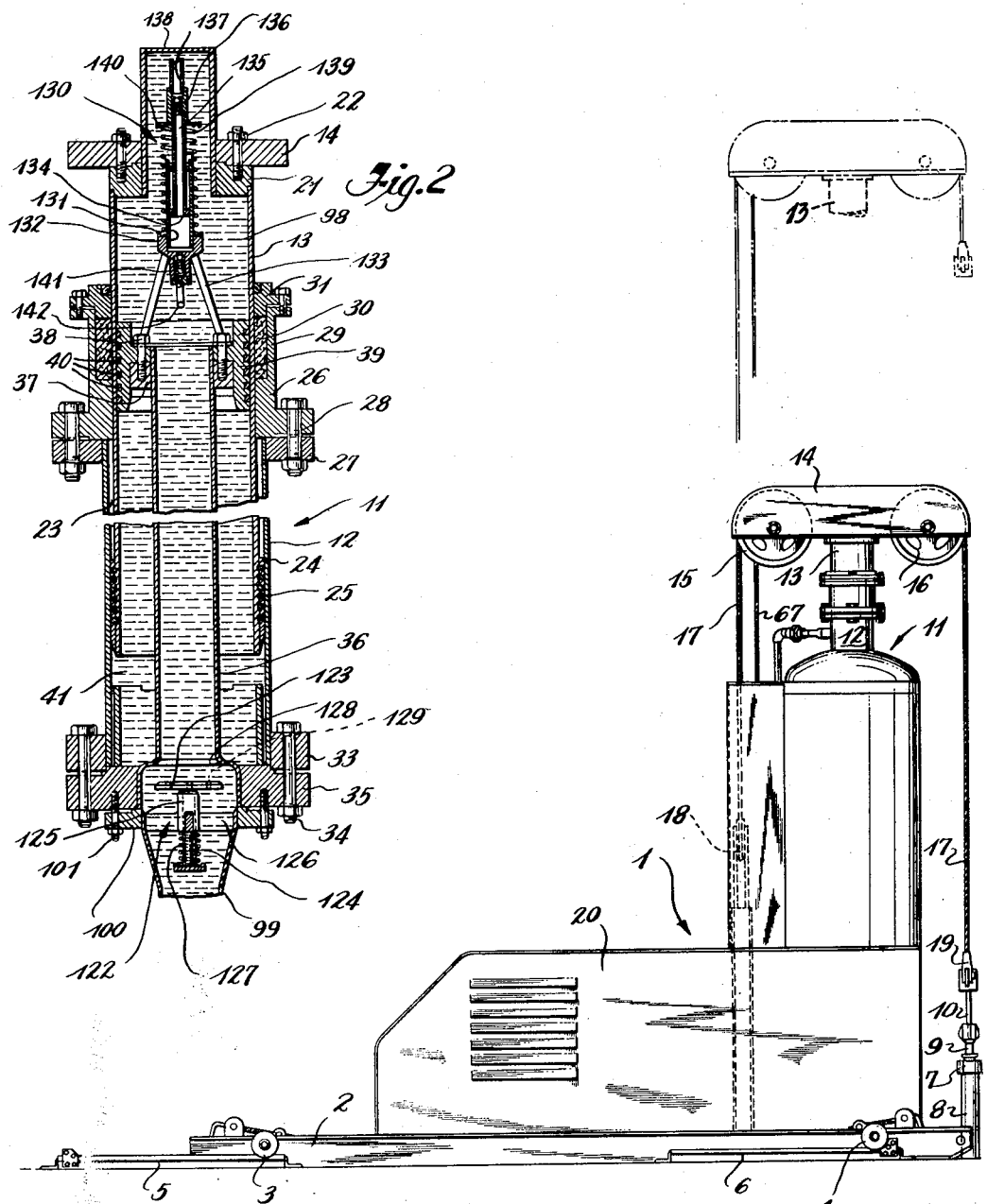

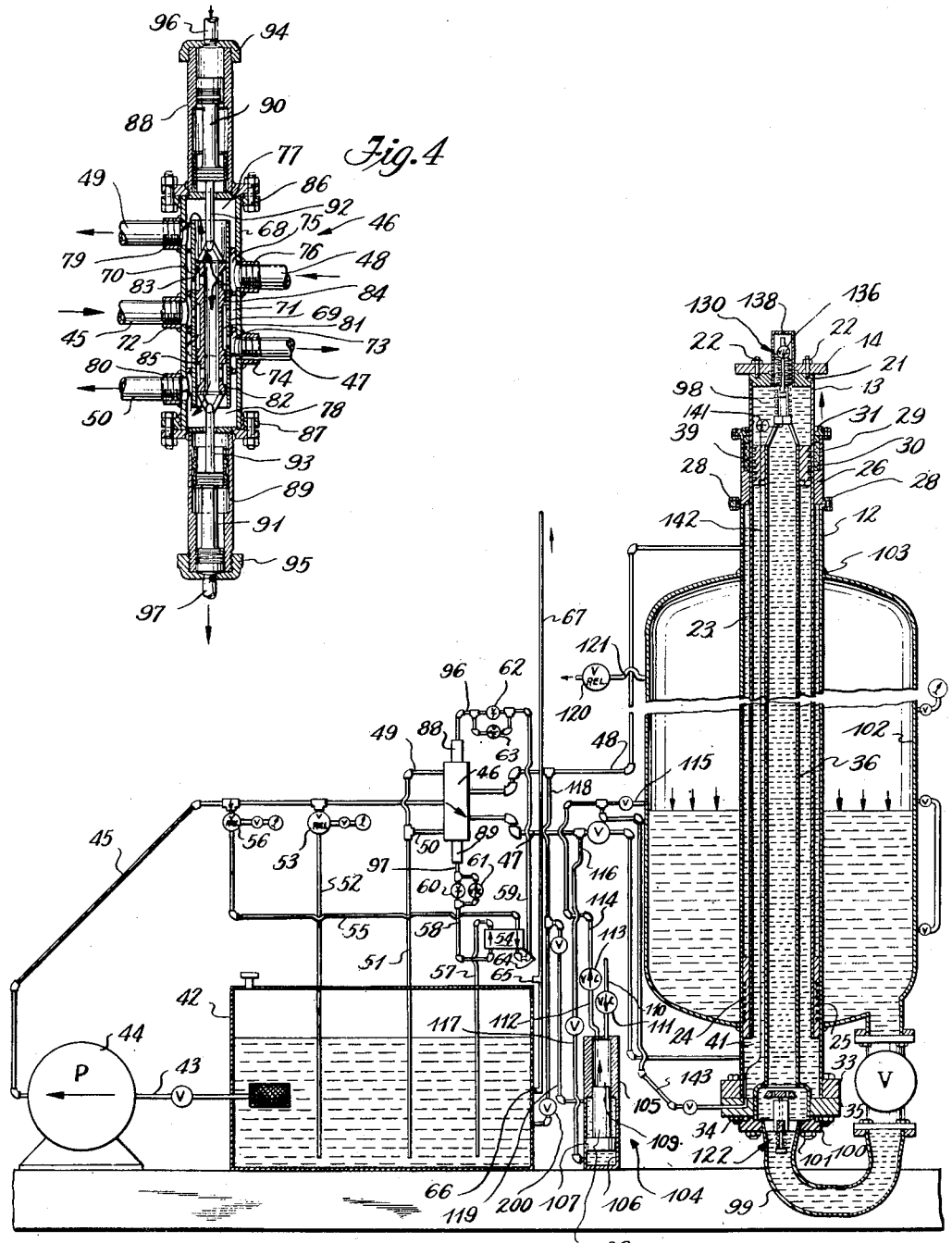

INVENTORS
PAUL E. NOLL, CHARLES W. CRAWFORD
BY T. DWIGHT ALLER &
ALBERT R. RETHEY

Donald G. Dalton
Attorney

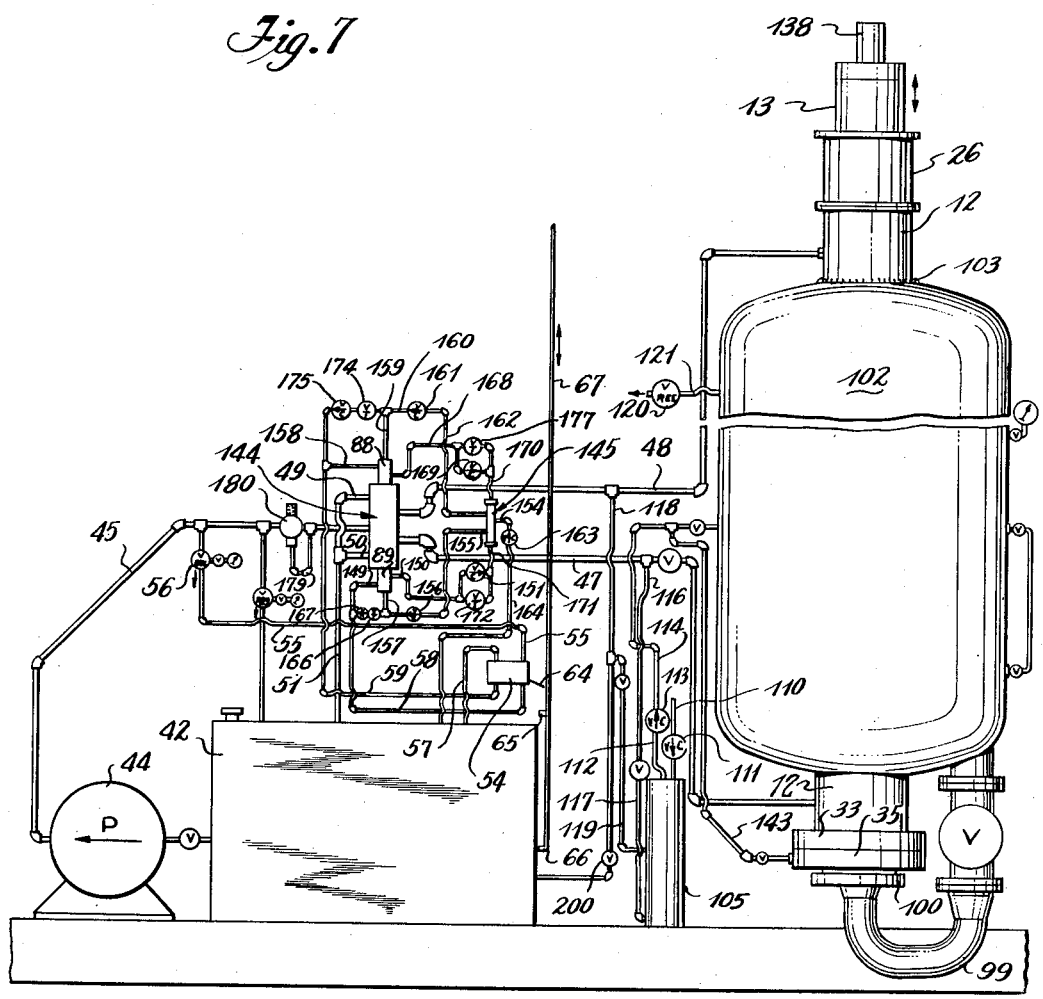

May 27, 1952 P. E. NOLL ET AL 2,598,590
CONTROL VALVE
Original Filed May 10, 1946 7 Sheets-Sheet 5
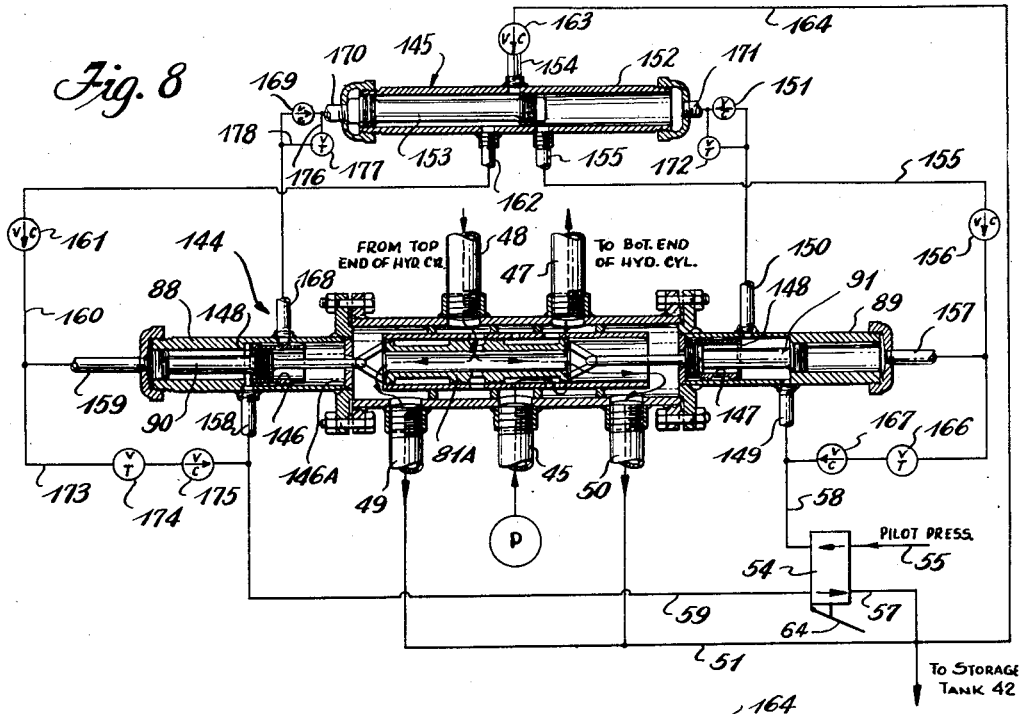
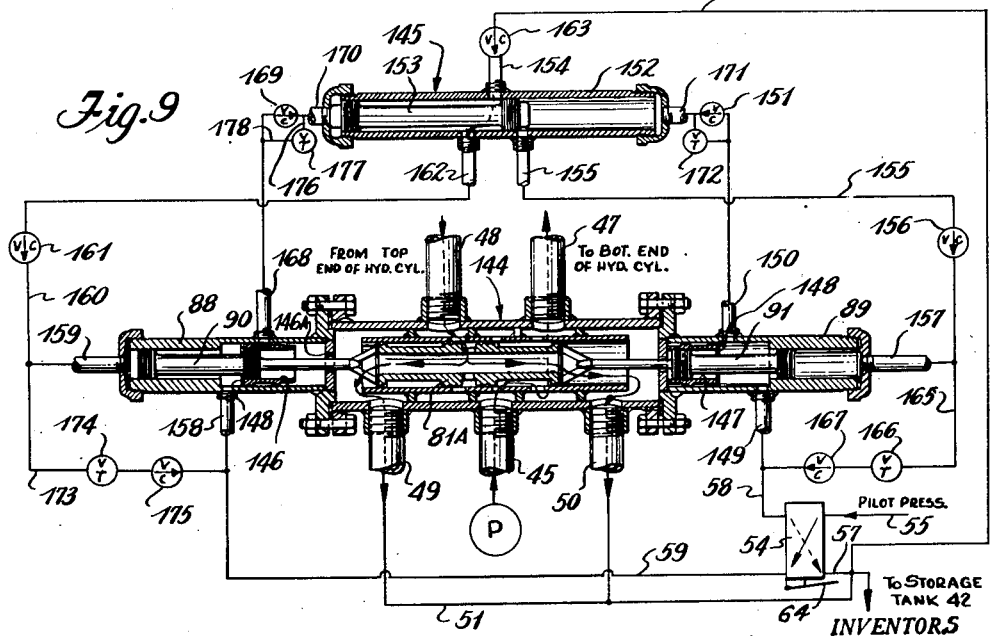
INVENTORS
PAUL E. NOLL, CHARLES W. CRAWFORD
T. DWIGHT ALLER &
BY ALBERT R. RETHEY
Donald G. Dalton
Attorney

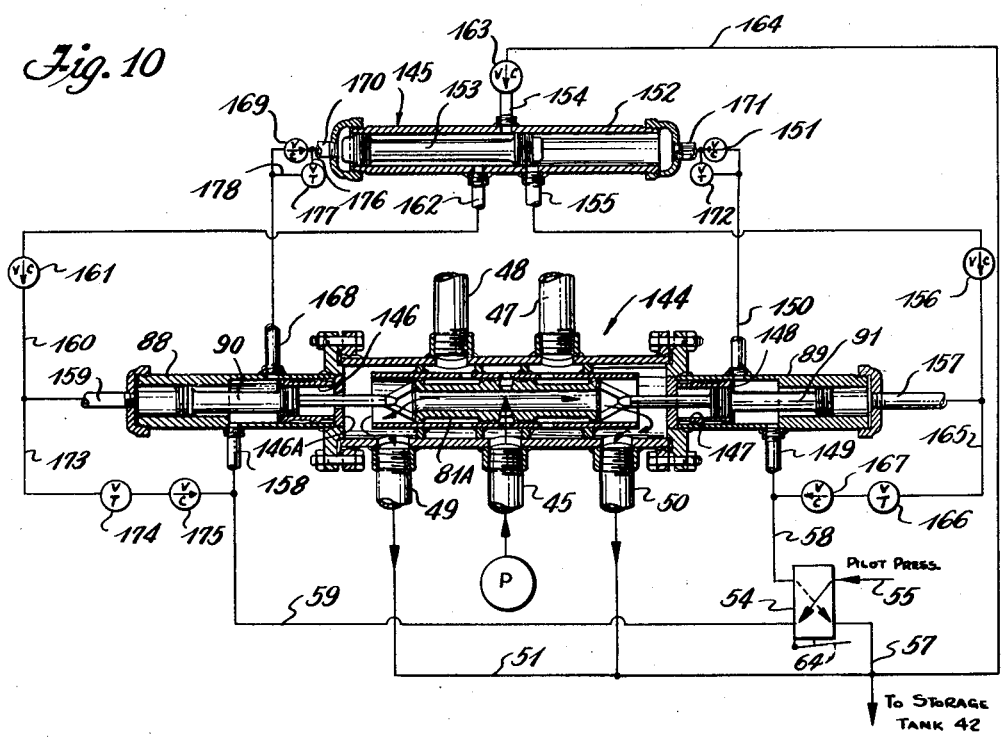

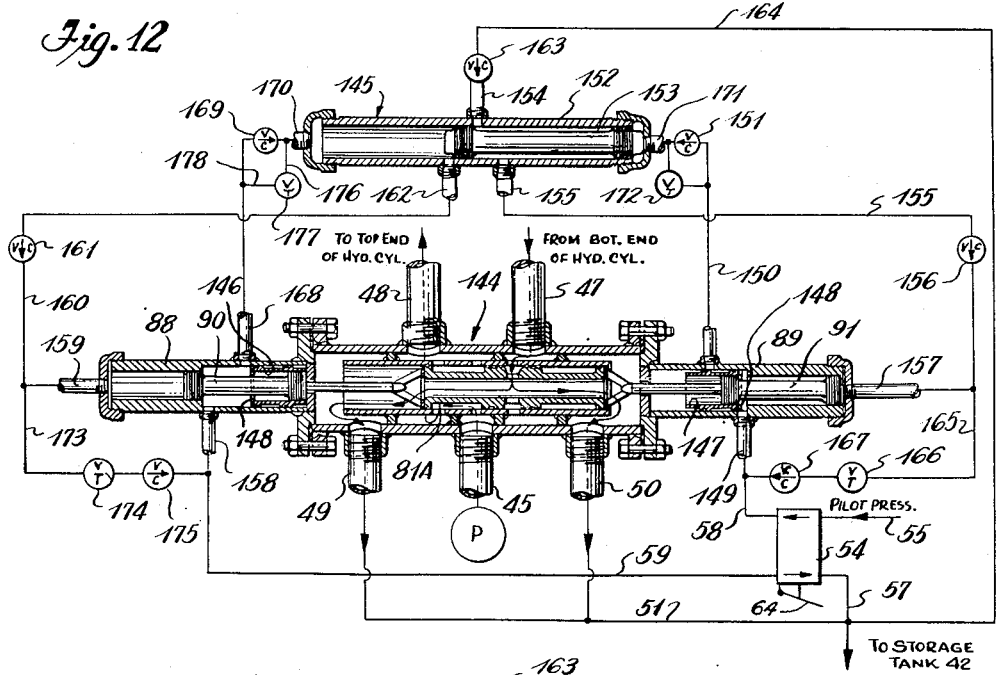

Patented May 27, 1952

2,598,590

UNITED STATES PATENT OFFICE 2,598,590

CONTROL VALVE

Paul E. Noil, Pasadena, Charles W. Crawford, Los Angeles, T. Dwight Aller, San Gabriel, and Albert R. Rethey, Los Angeles, Calif., assignors to United States Steel Company, a corporation of New Jersey Original application May 10, 1946, Serial No. 668,942, now Patent No. 2,504,218, dated April 18, 1950. Divided and this application December 1, 1949, Serial No. 130,382

10 Claims. (Cl. 121—46.5)

This invention relates to control valves and particularly to valves for controlling operation of pumping units of the type which include a hydraulically operated reciprocating ram that raises and lowers a sucker rod string.

Valves of the present invention are especially suited for pumping units of the type which are described and claimed in our copending application Serial No. 668,942, filed May 10, 1946, which issued as Patent No. 2,504,218, April 18, 1950, and is assigned to the assignee of the present application, and of which the present application is a division.

An object of the present invention is to provide novel hydraulic control valves for pumping units for obtaining the modes of operation which are described in our aforesaid copending application.

A further object of the invention is to provide hydraulic control valves which produce a dwell or pause at each end of a pump stroke, and which have means for adjusting accelerations and decelerations of the sucker rod string.

Other objects and advantages of this invention will be apparent from a study of the following specification read in connection with the accompanying drawings, wherein:

Figure 1 is a side elevational view illustrating the general form and appearance of the preferred embodiment of pumping unit described and claimed in our aforesaid copending application;

Figure 2 is a fragmentary cross-sectional view illustrating the details of construction of the hydraulic ram portion of the unit;

Figure 3 is a diagrammatic side elevational view of the apparatus shown in Figure 1 and illustrating the piping employed in the hydraulic power and control circuits, Figure 3 illustrating the operation of the device during the upstroke of the unit;

Figure 4 is a cross-sectional view of the main control valve which embodies features of the present invention and is used to control the operation of the hydraulic ram portion of the unit, Figure 4 illustrating the positions occupied by the parts of the valve during the phase of operation which is shown in Figure 3;

Figure 7 is a view similar to Figures 3 and 5 but illustrating a modified form of pumping unit in which means is provided for producing a pause or dwell at each end of the operating stroke, Figure 7 showing the piping employed in the hydraulic power and control circuits;

Figure 8 is a diagrammatic view showing in cross-section the details of construction of a main control valve and an auxiliary control valve which embody features of the present invention and are employed with the pumping unit shown in Figure 7, Figure 8 illustrating that portion of the operating sequence during which the unit is producing a power stroke;

Figure 9 is a view similar to Figure 8 but showing the operation of the apparatus at the time the ram of the unit approaches the upper end of the upstroke;

Figure 10 is a view similar to Figures 8 and 9 but illustrating the operation of the apparatus during the pause or dwell which is produced at the top of the upstroke;

Figure 11 is a view similar to Figures 8 through 10 but illustrating the sequence of operation during the return or down stroke of the hydraulic ram;

Figure 12 is a view similar to Figures 8 through 11 but illustrating the operation at a point near the bottom of the down stroke; and Figure 13 is a view similar to Figures 8 through 12 but illustrating the positions occupied by the parts during the pause or dwell which is produced at the bottom of the down stroke.

Figures 5, 6:
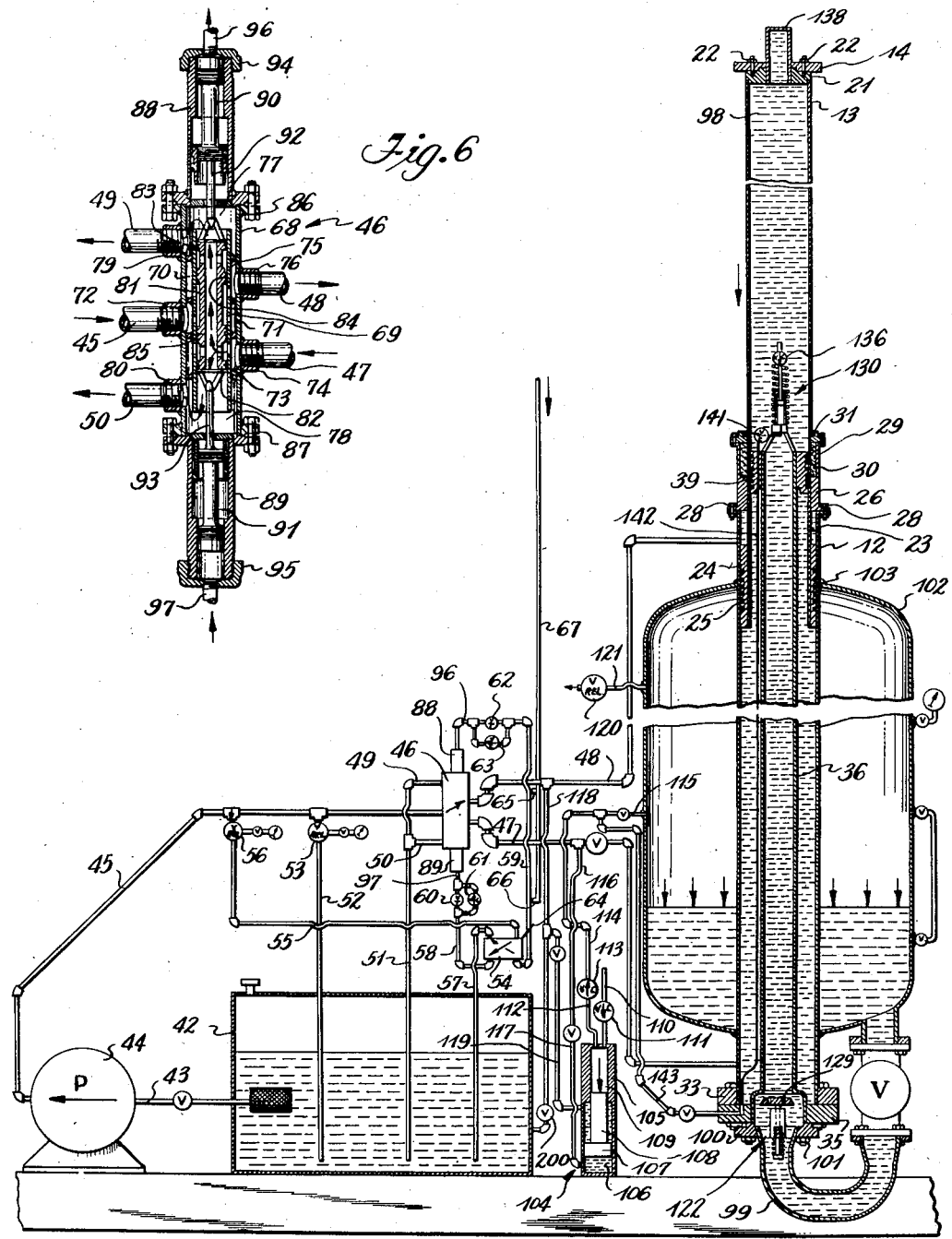
Figure 5 is a view similar to Figure 3 but showing the apparatus during the down stroke portion of the operating cycle.
Figure 6 is a view similar to Figure 4 but showing the positions occupied by the main control valve parts during the down stroke portion of the operating cycle.

Referring to the drawings, there is illustrated in Figure 1 a preferred embodiment of pumping unit described and claimed in our aforesaid copending application. In accordance therewith, the pump operating unit assembly indicated generally by the reference character 1 is mounted upon a base frame 2 which may be provided with wheels 3 and 4 and adapted to be raised or lowered into engagement with track members 5 and 6 to facilitate movement of the unit between an operating position illustrated and a retracted position, giving free working access to a casing head 7 which is used to terminate the upper end of a well casing 8 and flow tubing 9 mounted concentrically therein, through which a polish rod 10 extends, the polish rod 10 comprising the upper section of a string of sucker rods extended down through the well bore to the reciprocating pump which is mounted at the lower end of the flow tubing.

The unit 1 comprises a hydraulic ram mechanism indicated generally by the reference character 11 and comprising an outer cylinder 12 within which is telescopically inserted a ram 13.

the ram 13 being movable in a manner to be described hereinafter between a lowermost position such as is illustrated by solid lines in Figure 1 to an uppermost position such as is illustrated by dotted lines in that figure.

The upper end of the ram 13 carries a head member 14 which serves to journal two pairs of sheaves 15 and 16. A double cable 17, anchored as indicated diagrammatically at 18 by a fixed sheave is passed over the sheaves 15 and 16 and downwardly to a cable attachment 19 by means of which the ends of the cable 17 are secured to the polish rod 10. It will be seen that reciprocal motion of the ram 13 between the solid and dotted line positions illustrated in Figure 1 will effect a reciprocating motion of the polish rod 10; and that by reason of the double reeving employed, the stroke imparted to the polish rod 10 will be twice the distance through which the ram 13 is reciprocated. By this means it is possible to reciprocate the polish rod 10 through a stroke length which greatly exceeds the maximum stroke length which may be obtained with the conventional walking beam type of unit.

The unit 1 includes also a housing or enclosure 20 which serves to house the hydraulic equipment to be described hereinafter which is used to effect a reciprocation of the ram 13.

As is best shown in Figure 2, the hydraulic ram construction 11 comprises, as stated, the outer cylinder 12 within which the ram 13 is telescopically mounted. The ram 13 preferably comprises a tubular member, to the upper end of which is attached a head 21 to which is attached, as by means of studs and nuts 22, the sheave supporting head 14. The ram 13 is provided with an overall length substantially equal to or somewhat exceeding the length of the outer cylinder 12 and is made with a materially smaller diameter than the inside diameter of the cylinder 12 to define between the ram and cylinder an annular fluid receiving space 23. The lower end of the ram carries an annular piston member 24 which, by means of sealing rings 25, makes a fluid-tight sliding fit with the interior of the cylinder 12. The upper end of the ram 13 is guided by means of a guide member 26 which is secured to a flange 27 carried by the upper end of the cylinder 12 by means of bolts 28. The upper end of member 26 forms a stuffing box 29 in which packing material 30 and a gland member 31 cooperate to establish a fluid seal between the ram 13 and the upper end of the cylinder 12.

The lower end of the cylinder 12 carries a flange member 33 to which is secured, as by means of bolts 34, a lower closure member 35. The lower closure member 35 serves to support a central tubular member 36 which is secured at its lower end to the closure 35 and which is, at its upper end, secured as by means of a flange 37 and bolts 38 to a stationary piston 39 which, by reason of associated sealing rings 40, makes a fluid-tight sliding seal with the inner surface of the tubular ram 13. The tubular conduit 36 serves to define within the cylinder 12 a fluid receiving space 41 disposed below the ram piston 24. With the structure thus far described, it will be realized that fluid under pressure injected into the space 41 will cause the ram 13 to rise within the cylinder 12, whereas the injection of fluid under pressure into the annular space 23 above the ram piston 24 will cause the ram 13 to telescopically descend within the outer cylinder 12.

The manner in which this reciprocating motion of the ram 13 is obtained may be seen by having reference to Figure 3 wherein the remainder of the equipment and the piping is illustrated in diagrammatic form. As is shown in Figure 3, there is provided within the housing 20 a storage tank 42 for holding a supply of hydraulic fluid used in the operation of the system. An intake line 43 extends from the storage tank 42 to the inlet of a high pressure positive displacement pump 44, the discharge of which is connected by a conduit 45 to the pressure inlet port of a main control valve 46 which embodies features of the present invention and may be described generally as of the four-way type, but it will be described in detail hereinafter.

From the four-way valve 46 a conduit 47 leads to the annular space 41 beneath the ram piston 24 and another conduit 48 leads to the annular space 23 above the ram piston 24. Conduits 49 and 50 joining a conduit 51 lead from the four-way valve 46 to the storage reservoir 42.

The piping thus far described provides for the drawing of fluid from the storage tank 42 and supplying that fluid under pressure to the four-way valve 46. Depending upon the operative position of the valve 46, the fluid is supplied to the cylinder 12 either above or below the ram piston 24 to lower or raise the ram piston, and the fluid displaced from the opposite side of the piston by the movement thereof is returned to the four-way valve 46 and by means of the conduit 51 to the storage tank 42. As stated, the pump 44 is preferably of the positive displacement type and, therefore, a shunt line 52 is connected between the conduit 45 and the reservoir 42 through a pressure relief valve 53 to protect the pump from excessive pressure in case of line stoppage for any reason.

The main control valve 46 is hydraulically controlled by means of a four-way pilot valve 54. The valve 54 is connected by a conduit 55 to the conduit 45 through a pressure reducing valve 56. A conduit 57 connects the pilot valve 54 with the storage tank 42 while conduits 58 and 59 connect the pilot valve 54 with the main control valve 46. In conduit 58 is located a throttling valve 60 which is by-passed by a check valve 61 while a similar arrangement, including a throttling valve 62 and check valve 63, is employed in connection with the conduit 59.

The pilot valve 54 may be of any suitable conventional construction which includes an operating lever 64 so arranged that in one position of the lever 64 the conduit 55 will be connected to the conduit 59, while the conduit 58 is connected to the conduit 57 and such that in a second position of the lever 64, the conduit 55 will be connected to the conduit 58 and the conduit 59 will be connected to the conduit 57. The operating lever 64 is disposed in a position to be engaged by actuating members 65 and 66 mounted for adjustable movement along a control rod 67 which is preferably attached to the head member 14 to reproduce the reciprocating motion of the ram 13. The actuating members 65 and 66 are so positioned that the lever 64 is engaged by the actuating member 66 and moved from one position to another as ram 13 nears the upper end of its upstroke, and in such position that the actuating member 65 will engage the operating member 64 and move the valve back to its former position as ram 13 nears the bottom end of its down stroke.

The construction of the main control valve 46 is shown in Figure 4, in which figure the valve parts are shown as occupying positions corresponding to the phase of operation which is illustrated diagrammatically in Figure 3, in which the ram 13 has just started its upstroke. As is shown in Figure 4, the main control valve 46 comprises a body member 68 within which is mounted a cylinder 69. The cylinder 69 is made considerably smaller than the housing 68 to define between the cylinder 69 and the housing 68 an annular space 70.

The radial flanges or ribs welded or otherwise suitably secured to the exterior of the cylinder 69 and engaging the inner surface of the housing 68 serve to divide the annular space 70 into a number of chambers including a fluid inlet chamber 71 to which the conduit 45 is connected as by means of a connecting member 72, a bottom cylinder chamber 73 to which the conduit 47 is connected as by means of a connection 74, a top cylinder chamber 75 to which the conduit 48 is connected as by means of a connection 76 and fluid return chambers 77 and 78 situated at the ends of the housing member 68 and to which the conduits 49 and 50 are respectively connected as by means of connection members 79 and 80.

The chamber portions 77 and 78 are communicated with the interior of the cylinder 69 through the open ends thereof and the chambers 71, 73 and 75 are communicated with the interior of the cylinder 69 by means of fluid ports extending through the wall thereof.

There is reciprocally mounted within the cylinder 69 a tubular valve spool 81 characterized by end lands 82 and 83 between which are disposed intermediate lands 84 and 85. The annular space between lands 82 and 85 is communicated with the interior of the tubular spool 81 by means of radial ports through the wall thereof as is the annular space between the lands 83 and 84.

The ends of the housing 68 are preferably flanged as at 86 and 87 to permit a flanged connection thereto of operating cylinders 88 and 89. Operating pistons 90 and 91 are slidably mounted within the cylinders 88 and 89 and are provided with rods 92 and 93 which contact the ends of valve spool 81. The outer ends of the cylinders 88 and 89 are closed respectively by caps 94 and 95 which include means for attachment of conduits 96 and 97, the conduit 96 being connected to one side of the valves 62 and 63 and the conduit 97 being connected to one side of the valves 60 and 61. It will be appreciated that the admission of fluid under pressure through the conduit 96 to the interior of the cylinder 88 will move the piston 90 thereof downwardly as viewed in Figure 4 to shift the valve spool 81 to the position shown in that figure. Conversely, the position of the valve may be reversed by supplying fluid under pressure through the conduit 97.

In Figure 3 the various parts are shown in the positions occupied at the beginning of an upstroke. Near the end of the down stroke the actuating member 65 engaged the operating member 64 of the valve 54 and moved the same to a position connecting the conduit 55 to the conduit 59. Fluid under pressure from the pump discharge 45 and through the pressure reducing valve 56 is thus supplied to the conduit 59 and through the check valve 63 and conduit 96 to the cylinder 88 whose piston 90 was thereby moved to the position shown in Figure 4. In that position hydraulic fluid supplied through the conduit 45 is communicated to chamber 71 and through the ports in cylinder 69 to the annular space around valve spool 81 and between lands 84 and 85, and from there through other ports in the cylinder 69 to the chamber 73 connecting with the conduit 47.

Fluid flow is thus established between conduits 45 and 47 to supply fluid under pressure to the space 41 within the cylinder 12 beneath the ram piston 24. The resulting upward movement of the ram 13 displaces fluid from the annular space 23 which is conveyed through conduit 48 to the chamber 75 and through the corresponding cylinder wall ports to the annular space between lands 83 and 84. From this space the fluid flows through the ports in the wall of the tubular valve spool to the interior of the spool from where it is free to flow lengthwise into the end chambers 77 and 78. These chambers are connected to the conduits 49 and 50 so that the fluid displaced from the annular space 23 within the cylinder 12 is returned through conduit 51 to the storage tank 42. The ram 13 continues to rise until the lower actuating member 66 engages the operating member 64 to trip the pilot valve 54 to its alternate position interconnecting conduits 55 and 58. This supplies fluid under pressure through check valve 61 and conduit 97 to the interior of the cylinder 89, causing the piston 91 therein to move upwardly from that shown in Figure 4, to its alternate position which is illustrated in Figure 6. In so doing, the fluid contained within the cylinder 88 is displaced by the accompanying upward movement of the piston 90 and is accordingly returned through conduit 96 and throttling valve 62 to conduit 59 which is connected by the valve 54 to the return line 57 leading to the storage tank 42.

This flow of fluid from the cylinder 88 is all through the valve 62 since the check valve 63 is opposed to the reverse flow of fluid. Therefore, by adjusting the throttling valve 62, the rate at which fluid is displaced from the cylinder 88 may be adjusted so that the valve 46 may be caused to shift from the position shown in Figure 4 to that shown in Figure 6 at a suitably adjusted relatively slow rate.

As will be seen from a study of Figures 4 and 6 and a comparison of Figures 3 and 5, the shifting of the valve 46 from the position shown in Figure 4 to that shown in Figure 6 serves to connect the high pressure supply conduit 45 to the conduit 48 instead of to the conduit 47, and serves to connect the conduit 47 instead of the conduit 48 to the return line 51. This, of course, supplies fluid under pressure to the upper side of the ram piston to cause the ram to descend. However, since the valve spool 81 is slowly moved between the two positions, the ports traversed by the lands 82—85 are gradually closed to uniformly decelerate the upward movement of the ram 13 and the other ports are gradually opened to uniformly accelerate the downward motion of the ram 13. Since the acceleration and deceleration is dependent entirely upon the rate of movement of the valve spool 81, it is seen that the throttling valve 62 provides a complete adjustable control over the deceleration and acceleration of the ram piston at the upper end of the ram stroke.

In a similar way the shifting of the valve 46 from the position shown in Figure 6 to that shown in Figure 4 occurring near the end of the down stroke of the ram, is accompanied by a return of fluid through the throttling valve 60 which may be adjusted to regulate, as desired, the deceleration and acceleration of the ram at the end of the down stroke in the same way as has just been described in connection with the throttling valve 62.

During the above described sequence of operations the ram 13 is reciprocated to thereby reciprocate the polish rod 10 through the driving connection afforded by the cable 17. It will be seen that during the upstroke, the load applied to the cable 17 is the weight of the sucker rod string, plus the weight of the column of oil lifted; whereas during the down stroke, the weight of the column of fluid is carried by the foot valve of the oil well pump so that there is applied to the cable 17 only the weight of the sucker rod string. Accordingly, to avoid an undesirable condition of varying load on the prime mover, it is preferred to apply an upward acting counterbalancing force to balance the weight of the sucker rod string, plus approximately one-half of the weight of the column of fluid contained within the flow tubing.

This counterbalancing force is preferably applied to the interior of the ram 13 by means of an incompressible fluid such as oil which fills a space 98 comprising the interior of the tubular ram 13 and which communicates with the interior of the central tubular member 36, as is best shown in Figures 2 and 3. The tubular member 36 is connected to a conduit 99, by means of a flanged attachment 100 which is secured as by means of bolts 101 to the lower closure member 35. The conduit 99 is connected, as shown in Figure 3, to the interior of an annular pressure chamber 102 which, by preference, surrounds the outer cylinder 12 and is secured thereto as by means of welding 103. The pressure chamber 102 is partially filled with incompressible fluid while the upper portion is filled with gas under pressure. The gas contained within the upper portion of the chamber 102 is introduced at a pressure sufficient to cause the incompressible fluid conducted to the interior of the ram 13 through the conduits 99 and 36 to exert an upward force on the ram 13 equal to the desired counterbalancing force to be exerted.

In order to compensate for the possible loss of gas from the upper portion of the pressure chamber 102, there is provided a make-up pump indicated generally at 104 in Figure 3. The pump 104 preferably comprises a cylinder member 105 which is bored as at 106 to receive a piston 107. To the piston 107 there is secured a piston extension 108 which is adapted to reciprocate within a gas compressing bore 109. An intake line 110 is adapted to be connected to a suitable source of gas, or in the event air is used as the gas to fill the pressure chamber 102, the end of the conduit 110 is merely communicated with the atmosphere.

The conduit 110 communicates through a check valve 111 to the interior of the gas compressing cylinder bore 109. A discharge line 112 also communicates with the interior of the bore 109 and is passed through a check valve 113. From the check valve 113 a conduit 114 leads to the interior of the pressure chamber 102, as shown at 115. With the construction thus far described, it will be seen that reciprocation of the piston extension 108 will allow gas to flow into the bore 109 during the down stroke of the piston and will during the upstroke thereof deliver said gas under pressure to the interior of the pressure chamber 102.

The piston extension 108 is reciprocated by the application of fluid pressure alternately to opposite ends of the cylinder 106. For this purpose conduits 116 and 117 are connected between the bottom of the cylinder 106 and the line 47 which leads from the valve 46 to the lower end of the main hydraulic ram cylinder. Similarly, conduits 118 and 119 lead from the upper end of the cylinder 106 to the line 48 connecting the main control valve 46 with the upper end of the main hydraulic cylinder. Since fluid under pressure is alternately supplied to and returned from each of the lines 47 and 48 by the action of the main control valve 46, it will be seen that the piston 107 and piston extension 108 will be reciprocated in the same manner as ram 13 and that as a result thereof, air or other suitable gas will be continually forced into the pressure chamber 102.

In order that the pressure within the chamber 102 may be held at a proper and regulated value, a manually adjustable pressure relief valve 120 is connected to the interior of the chamber 102 as by means of a conduit 121. In normal operation, the gas make-up pump 104 supplies gas at a rate in excess of the leakage requirements so that the excess may be discharged through the pressure relief valve 120. This valve then operates to maintain a substantially constant average pressure within the interior of the pressure chamber 102.

In the event the sucker rod string should break, the load which is applied to the ram 13 would be instantly materially reduced, with the result that in the absence of some means for arresting or retarding upward movement of the ram, the counterbalancing force exerted by the gas compressed within the pressure chamber 102 would cause the ram 13 to rise at a destructive velocity.

Accordingly, the pumping unit includes a velocity limiting valve 122 (see Figure 2) which comprises a disc-like valve member 123 mounted upon a stem 124 which is slidably mounted in a guide 125 carried by a spider 126 secured to the conduit 99. A spring 127 is employed to normally urge the valve 123 to a retracted position, such as that shown in Figure 2, in which the valve member 123 is spaced from a seat 128 which it is adapted to engage in its upper position. A plurality of apertures or ports 129 are provided in the valve disc 123 so that in its upper position, the flow of fluid through the conduits 99 and 36 will not be completely arrested but merely throttled.

The pressure of the spring 127 is so adjusted as to maintain the valve 123 in the normal position shown in Figure 2 during normal operation of the apparatus. However, should the sucker rod string break or the downward load imposed upon the ram 13 be for any other reason immediately relieved, then flow of fluid through the conduit 99 and past the valve 123 will rise to a value materially exceeding the normal rate of flow. The hydraulic friction drag exerted on the valve 123 will then overcome the force of the spring 127 and move the valve 123 to its closed position so that thereafter fluid transferred from the conduit 99 to the conduit 36 must be passed through the small holes 129 in the valve disc 123. This throttling action serves to limit to a safe value the rate of upward movement of the ram 13.

In order for the above-described counterbalancing action to take place continuously and over long periods of operation, it is necessary that any gas which may move into the space 98 be removed therefrom to prevent an accumulation of gas in the upper end of the interior of the ram 13. To this end there is provided a scavenging pump indicated generally by the reference character 130 which comprises a cylinder member 131 mounted upon a lower head member 132 which is in turn carried by uprights 133 secured to the stationary piston 39. A piston 134 is reciprocally mounted within the cylinder 131 and carries a tubular piston rod 135 which extends through an intake check valve 136 to an inlet conduit 137 which is terminated in a position to be engaged by an upper cap member 138 (serving as a closure for the interior of the ram 13) during the last few inches of downward travel of the ram 13. This serves to move the piston 134 downwardly within the cylinder 131. When the ram 13 is moved upwardly, the piston 134 is simultaneously moved upwardly by means of a compression spring 139 which surrounds the cylinder 131 and is engaged between the lower head 132 and a disc-like member 140 secured to the piston rod 135. The head member 132 is chambered as shown in Figure 2 to house a discharge check valve 141 which communicates with a conduit 142 which is connected as shown in Figure 3 to an external conduit 143 connecting with the conduit 115.

It will be seen that the structure just described comprises a small pump mounted within the interior of the ram 13 and which operates to take in fluid or gas from the extreme upper end of the space 93 and discharge the same through the conduits 142 and 143 to the conduit 115 by which it is returned to the interior of the pressure chamber 102. Thus, any tendency for gas or air to collect in the space 93 is completely offset by the removal of that gas as fast as it accumulates.

As hereinbefore stated, it is desirable to provide in a control system of the character described a means for causing the ram to pause for a predetermined length of time at each end of the stroke. There is accordingly illustrated in Figures 7 through 13 an alternative embodiment of the pumping unit which includes the necessary control apparatus for providing such a pause or dwell at each end of the operating stroke. As will be apparent from Figure 7, the apparatus employed is substantially identical to that which has been described hereinbefore except for the substitution in place of the valve 46 of a different main control valve which also embodies features of the present invention and is indicated generally in Figure 7 by the reference character 144 and the association therewith of a dwell cylinder 145. Also, there is interposed between the conduit 45 leading from the pump 44 and the pressure inlet port of the four-way control valve 144 a resistance valve 180, the purpose of which will be described hereinafter.

As before, the main hydraulic power supply connections comprise conduits 47 and 48 leading from the four-way control valve 144 respectively to the lower and upper ends of the hydraulic cylinder 12 and return lines 49, 50 and 51 leading from the four-way control valve 144 to the reservoir 42. As in the previously described modification, the pilot control valve 54 is connected by the conduit 55 and pressure regulating valve 56 to the conduit 45 and is provided with the return line 57 leading to the reservoir 42. In the alternate positions of the pilot control valve 54, it is adapted, as before, to connect the conduit 55 to conduits 58 and 59, which conduits lead to the main control valve 144 and the associated apparatus to be described hereinafter. The valve 54 is shifted between its two operating positions by means of the operating member 67 and the valve control lever 64.

In Figure 8 there is illustrated the construction of the four-way control valve 144 and the construction of the dwell cylinder 145. There is also shown diagrammatically the piping which interconnects these two valves with the pilot control valve 54. The main control valve 144 is substantially identical to the control valve 46 hereinbefore described, the principal difference residing in the construction of the valve spool 81A and the operating cylinders 88, 89 and the pistons 90, 91 therefor.

As will be seen in Figure 8, at one end of each of the cylinders 88 and 89 there are mounted sliding sleeves 146 and 147 which make sealing engagements piston-wise with the walls of the cylinders 88 and 89 and which in turn slidably receive the inner end of the pistons 90, 91. Mechanical connection between the sleeves 146 and 147 and the associated pistons is effected by means of annular members 148 which are secured to the outer ends of the sleeves 146 and 147 and which flange inwardly behind the enlarged end of the spool pistons which are received within the sleeves. By inspection of Figure 8, it will be seen that an inward movement of either sleeve 146 or 147 will mechanically drag the pistons 90 or 91 therewith to a mid-position, but that the pistons are each permitted additional inward movement to an extreme inner position. It will also be seen that upon movement of either piston to its extreme outer position as, for example, that occupied by the piston 90 in Figure 8, the corresponding sleeve will be mechanically moved to its outermost position.

In Figure 8 the parts are shown in the position they occupy during an upward stroke of the ram 13. It will be seen that fluid under pressure supplied to the conduit 45 is conveyed to the conduit 47 through the valve 144 and to the lower end of the hydraulic cylinder 12. Fluid returned from the upper end of the hydraulic cylinder 12 is returned through conduit 48 through the valve 144 to conduits 49 and 50 and from there to the conduit 51 and storage tank 42.

During this time pilot control pressure derived from the conduit 55 is conveyed through the pilot valve 54 and conduit 58 to a conduit 149 communicating with the interior of the cylinder 89. In this part of the cycle of operations the piston 91 and sleeve 147 associated therewith occupy the position shown in Figure 8 so that fluid may flow from conduit 149 through the interior of the cylinder 91 to a conduit 150 which is connected through a check valve 151 to the right-hand end of the dwell cylinder 145 which comprises an elongated hydraulic cylinder 152 within which is reciprocally mounted a spool-shaped piston member 153.

The piston member 153 now occupies the extreme left-hand position, in which position the right-hand end of the spool 153 lies between a centrally located inlet conduit 154 and a conduit connection 155. Therefore, in the position shown, fluid flowing into the interior of the cylinder 152 through the check valve 151 may flow out the conduit 155 and through a check valve 156 to a conduit 157 which communicates with the right-hand end of the cylinder 89 to thereby urge the piston 91 to the left to the position shown in Figure 8.

As the ram 13 approaches the upper end of the upstroke, the pilot valve 54 is shifted to its alternate position to supply control pressure from the source conduit 55 to the conduit 59 and at the same time to release pressure from conduit 58 through conduit 57 to the storage tank. As is shown in Figure 9, the supply control pressure is conveyed through a conduit 158 to the interior of the cylinder 88 at a point to the left of sleeve 146, as viewed in Figure 9. This pressure is effective to cause the sleeve 146 and piston 90 to move to the right as viewed in Figure 9 because the area of the end of the sleeve 146 is greater than the area of the left-hand end of the piston 90. The resulting movement of the piston 90 to the right moves the valve spool 81A of the main control valve 144 toward a neutral position. As this motion takes place, fluid to fill the left-hand end of the cylinder 88 enters through conduits 159 and 160, check valve 161 and conduit 162 communicating with the interior of the dwell cylinder 152. Because of the then position of the dwell piston 153, the conduit 162 is communicated with the inlet conduit 154 so that fluid may enter through that conduit through a check valve 163 and a conduit 164 which is in communication with the storage tank 42. Likewise, fluid displaced from the interior of the cylinder 89 by movement of the piston 91 to the right is discharged through the conduit 157. It is prevented from flowing into the conduit 155 by reason of the check valve 156 and is, therefore, forced to flow through a conduit 165, throttling valve 166 and check valve 167 to the conduit 58 which is connected through the control valve 54 to the conduit 57 which returns to the storage tank 42.

The described movement of the piston 90 to the right continues until the spool 81A of main control valve 144 reaches a neutral position, at which time the sleeve 146 associated with the piston 90 has seated against stop 146A and has uncovered a port leading to a conduit 168 which directs the pressure fluid through check valve 169 and conduit 170 to the left-hand end of dwell cylinder 152.

As is shown in Figure 10, the neutral position of the spool 81A in main valve 144 is such that the pressure supply line 45 is communicated directly with the two return lines 49 and 50 while the two cylinder lines 47 and 48 are closed off. In this position of the valve, therefore, movement of the ram 13 is arrested and the ram remains stationary so long as the spool 81A remains in the neutral position.

The rate of movement of the main valve from the position shown in Figure 9 to that shown in Figure 10 is controlled for the purpose of controlling the rate of deceleration of the ram 13 by adjustment of the valve 166 which regulates the rate at which fluid may be displaced from the cylinder 89 by the movement of the piston 91 therein. When the valve 144 reaches a neutral position as shown in Figure 10, the uncovering of the port leading to the conduit 168 intercommunicates the conduits 158 and 168 so that fluid under pressure delivered from the pilot valve 54 through conduit 59 may flow through the conduit 168, a check valve 169 and conduit 170 to the left-hand end of the dwell cylinder 152. The pressure thus applied to the left-hand end of the piston 153 causes said piston to move to the right within the cylinder 152 toward the opposite end of the cylinder.

During the first part of this motion the right-hand end of the piston 153 closes the port leading to the conduit 155 so that fluid contained within the cylinder 152 to the right of the piston 153 will be displaced therefrom through conduit 171, throttling valve 172 and conduit 150 to the interior of the cylinder 89. By virtue of the sliding interconnection of the piston 91 with the sleeve 147, the movement of the piston 91 to the right to the mid-position did not produce any motion of the sleeve 147 so that a fluid connection between conduits 150 and 149 remains through the interior of the cylinder 89. Fluid thus passed into the conduit 149 is conveyed by conduit 58 to the pilot valve 54 and thence by way of conduit 57 to the storage tank 42.

The flow of the displaced fluid just described is forced through the throttling valve 172 by reason of the flow being in a direction reverse to that permitted by the check valve 151. Thus adjustment of the throttling valve 172 may be employed to control the rate of travel of the piston 153 within the cylinder 152 and, therefore, the length of time required for the piston to move from the position shown in Figure 10 to that shown in Figure 11. When the piston 153 finally reaches the right-hand end of the cylinder 152 as is shown in Figure 11, the left-hand end of the piston 153 uncovers the port which communicates with the conduit 162. This establishes a communication between the conduits 170 and 162 so that fluid flowing into the cylinder 152 through the conduit 170 may now flow through conduit 162, check valve 161 and conduits 160 and 159 to the interior of the cylinder 88 at the left-hand end of the piston 90. This application of pressure to the left-hand end of the piston 90 causes the piston to move to the right to shift the spool 81A of main control valve 144 to its other operating position in which fluid under pressure supplied through conduit 45 is conveyed to the upper end of the hydraulic cylinder through conduit 48 while fluid returned from the lower end of the hydraulic cylinder through conduit 47 is conveyed by means of conduits 49, 50 and 51 to the storage tank 42, thus starting the descent of the ram on its down stroke. During movement of the valve spool 81A from the position shown in Figure 10 to that shown in Figure 11, fluid is again displaced from the cylinder 89 through conduits 157, 165 and valves 166 and 167 as was described in connection with Figure 9. As before, the valve 166 in throttling this flow regulates the rate of travel of the valve spool 81A to the position shown in Figure 11.

The valves remain in the position shown in Figure 11 until the ram 13 approaches the lower limit of its down stroke, at which time the pilot control valve 54 is tripped to its first position connecting the pressure source line 55 to the conduit 58 and connecting the conduit 59 to the return line 57 leading to the storage tank 42 as shown in Figure 12. In this position fluid under pressure is conveyed through conduits 58 and 149 to the interior of the cylinder 89 to act on the sleeve 147 and move that sleeve and the piston 91 to the left, as viewed in Figure 12, to move the spool 81A of main control valve 144 from a position shown in Figure 12 to a neutral position, such as is shown in Figure 13, in which position conduits 47 and 48 leading to the hydraulic cylinder are cut off and flow is established between the pressure supply conduit 45 and the return conduits 49 and 50.

During movement of the spool 81A of main valve 144 to the left, fluid displaced from the cylinder 88 by movement of the piston 90 therein is conveyed through conduit 159, conduit 173, throttling valve 174 and check valve 175 to conduit 59 which is connected through the control valve 54 to the return conduit 57 leading to the storage tank 42. Flow of fluid from the conduit 159 through conduit 160 is prevented by the check valve 161. The rate of movement of the spool 81A to the left is controlled by regulation of the throttling valve 174.

When the main valve reaches a neutral position as is shown in Figure 13 communication is established between conduits 149 and 150 to supply fluid under pressure through check valve 151 to the right-hand end of the dwell cylinder 152 to cause the piston 153 thereof to move to the left from the position shown in Figure 13 to that shown in Figure 8. During this movement fluid which is displaced by the movement of the piston 153 from the left-hand end of the cylinder 152 is conveyed through conduits 170, 176, throttling valve 177, conduit 178, conduit 168 through the cylinder 88 and by way of conduits 158, 59 and control valve 54 through conduit 57 to the storage tank 42. The check valve 169 forces the fluid to flow through the throttling valve 177, which may be used to regulate the rate of travel of the piston 153 to the left within the cylinder 152 and, therefore, determine the length of time the ram 13 remains stationary at its lowermost position. When finally the piston 153 reaches the extreme left-hand position in moving from the position shown in Figure 13 to that shown in Figure 8 communication is established as shown in Figure 8 between conduits 150 and 155 so that fluid may flow through check valve 156 and conduit 157 to the right-hand end of the cylinder 89 and cause movement of spool 81A of the main valve 144 to the left to the position shown in Figure 8, in which position hydraulic fluid is supplied to the main cylinder 12 in such a manner as to cause the ram 13 to rise therein.

As before, fluid displaced by movement of the piston 90 will be returned through conduits 159 and 173 and through the throttling valve 174 so that the rate of movement of the main valve is subject to control to thereby regulate the acceleration of the ram in the upward direction. As the ram nears the upper limit of its upward stroke, the above-described cycle of operation is repeated.

Reference has been made hereinbefore to the resistance valve 180. This valve is connected, as shown in Figure 7 and arranged to be operated by a control connection 179, by means of which pressure existing in the pressure supply line ahead of main valve 144 is applied to overcome a spring in valve 180 and hold the valve open. It will be seen that during the neutral position of the main valve 144, as is shown in Figures 10 and 13, the hydraulic power fluid supplied to the valve 144 is returned directly to the storage tank 42 against little, if any, resistance. When this occurs, the spring in valve 180 partially closes the valve to maintain within the conduit 45 a pressure sufficient to supply through the conduit 55 adequate operating pressure for operating the control apparatus as above described.

It will be noted that in the operation of reciprocating deep well pumps, the sucker rods are substantially relieved of all fluid load during the down stroke and hence the rods may be moved through the down stroke at a much more rapid rate than would be permissible during the upstroke of the pump. This pump operating unit is particularly adapted for this type of operation by virtue of the construction of the double-acting hydraulic ram described herein.

It will be observed that the piston 24 has a considerably greater area exposed to the fluids at its lower end than at its upper end. By reason of this construction, the operation of the pump 44 as a constant volume delivery pump will automatically produce a much more rapid down stroke than upstroke of the ram and consequently a similar difference in the speed of movement of the sucker rods.

By referring particularly to Figure 5, it will be observed that during the down stroke of the ram piston 24, the pump 44 delivers fluid through the conduit 48 to the space 23, and it will also be observed that the conduit 118 which connects with the conduit 48 is coupled to the tank 42 with a valve 200 interposed in the conduit 118. Hence, the rate of speed on the down stroke may be regulated by controlling valve 200. If valve 200 is opened slightly, a portion of the fluid delivered by the pump 44 will by-pass through the conduit 118 back to the tank 42, while the remainder of the fluid delivered by the pump 44 will be delivered to the annular space 23. Hence, as the valve 200 is moved to progressively greater open positions, the volume of fluid which will be delivered to the annular space 23 will be progressively diminished and the down stroke of the ram will be progressively slower and slower.

From the foregoing description it is seen that the control valve of the present invention furnishes a mechanism for causing the ram to remain stationary for a predetermined length of time at both ends of the stroke and that provision has been made for separately and independently adjusting the duration of the inactive periods.

The claims in the present application are confined to the novel control valve structure for the reason that the unit itself apart from the control valve is claimed in our copending application to which we have already referred.

While there has been shown and described the preferred embodiment of the present invention, the same is not to be limited to any of the details of construction shown or described herein, except as defined in the appended claims.

We claim:

1. In a four-way control valve including a valve body having ports and a slide member movable therein from one operating position interconnecting certain of said ports through a neutral position to another operating position otherwise interconnecting said ports, the combination of: a pair of cylinders secured to opposite ends of said valve body; a piston in each of said cylinders; means for transmitting motion of said pistons to said slide member; means for applying fluid pressure to one of said cylinders to move said slide member toward said neutral position; control means for arresting movement of said slide member at said neutral position; an auxiliary cylinder; an auxiliary piston slidably mounted in said auxiliary cylinder; means responsive to arrival of said slide member at said neutral position to apply fluid pressure to one end of said auxiliary cylinder and thereby to move said auxiliary piston; and means responsive to movement of said auxiliary piston from one end of said auxiliary cylinder to the other to apply fluid pressure to one end of said one cylinder to thereby move said slide member from said neutral position to the other of said operating positions, said slide member in moving between its two operating positions thus dwelling at its neutral position for the interval required for said auxiliary piston to travel from one end of said auxiliary cylinder to the other.

2. In a four-way control valve including a valve body having ports and a slide member movable therein from one operating position interconnecting certain of said ports through a neutral position to another operating position otherwise interconnecting said ports, the combination of: a pair of cylinders secured to opposite ends of said valve body; a piston in each of said cylinders; means for transmitting motion of said pistons to said slide member; means for applying fluid pressure to one of said cylinders to move said slide member toward said neutral position; control means for arresting movement of said slide member at said neutral position; an auxiliary cylinder; an auxiliary piston slidably mounted in said auxiliary cylinder; means responsive to arrival of said slide member at said neutral position to apply fluid pressure to one end of said auxiliary cylinder and thereby to move said auxiliary piston; means responsive to movement of said auxiliary piston from one end of said auxiliary cylinder to the other to apply fluid pressure to one end of said one cylinder to thereby move said slide member from said neutral position to the other of said operating positions; and means for regulating the rate of travel of said auxiliary piston in said auxiliary cylinder, said slide member in moving between its two operating positions thus dwelling at its neutral position for the interval required for said auxiliary piston to travel from one end of said auxiliary cylinder to the other.

3. In a four-way control valve including a valve body having ports and a slide member movable therein from one operating position interconnecting certain of said ports through a neutral position to another operating position otherwise interconnecting said ports, the combination of: a pair of valve cylinders secured to opposite ends of said valve, a first piston in each of said valve cylinders, piston rods attached to said first pistons to contact said slide member, second pistons in each of said valve cylinders movably coupled with said first pistons, means for applying fluid pressure to one of said valve cylinders to act on the second piston therein for moving said slide member toward said neutral position, stop means with which this second piston is engageable for arresting movement of said slide member at said neutral position, an auxiliary cylinder, an auxiliary piston slidably mounted in said auxiliary cylinder, conduit means connecting the valve cylinders and said auxiliary cylinder for applying fluid pressure to one end of said auxiliary cylinder on arrival of said slide at said neutral position and thereby moving said auxiliary piston, and additional conduit means connecting said auxiliary cylinder and the valve cylinders to apply fluid pressure to act on the first pistons therein on movement of said auxiliary piston from one end of said auxiliary cylinder to the other to move said slide member from said neutral position to the other of said operating positions, said slide member in moving between its two operating positions thus dwelling at its neutral position for the interval required for said auxiliary piston to travel from one end of said auxiliary cylinder to the other.

4. In a four-way control valve including a valve body having ports and a slide member movable therein from one operating position interconnecting certain of said ports through a neutral position to another operating position otherwise interconnecting said ports, the combination of: a pair of valve cylinders secured to opposite ends of said valve, a first piston in each of said valve cylinders, piston rods attached to said first pistons to contact said slide member, second pistons in each of said valve cylinders movably coupled with said first pistons, means for applying fluid pressure to one of said valve cylinders to act on the second piston therein for moving said slide member toward said neutral position, stop means with which this second piston is engageable for arresting movement of said slide member at said neutral position, an auxiliary cylinder, an auxiliary piston slidably mounted in said auxiliary cylinder, conduit means connecting the valve cylinders and said auxiliary cylinder for applying fluid pressure to one end of said auxiliary cylinder on arrival of said slide at said neutral position and thereby moving said auxiliary piston, additional conduit means connecting said auxiliary cylinder and the valve cylinders to apply fluid pressure to act on the first pistons therein on movement of said auxiliary piston from one end of said auxiliary cylinder to the other to move said slide member from said neutral position to the other of said operating positions, and means for regulating the rate of travel of said auxiliary piston in said auxiliary cylinder, said slide member in moving between its two operating positions thus dwelling at its neutral position for the interval required for said auxiliary piston to travel from one end of said auxiliary cylinder to the other.

5. A control valve comprising an outer body member, an open ended cylinder supported within said body member in spaced relation thereto, crosswise flanges dividing the space between said cylinder and said body member into three intermediate and two end chambers, said body member having an exhaust port communicating with each of said end chambers, an inlet port communicating with the central intermediate chamber, and operating ports communicating with the two other intermediate chambers, said cylinder having ports, one of which communicates with each of said three intermediate chambers, a tubular valve spool slidably mounted in said cylinder and having an end land adjacent each end, two intermediate lands and two ports, one of which is situated between each end land and the nearer intermediate land, said valve spool having two operating positions in which said inlet port is communicated selectively with either of said operating ports, and the other operating port is communicated with said exhaust port, operating cylinders mounted on the ends of said body member, reciprocable operating pistons in said operating cylinders, piston rods for transmitting motion of said operating pistons to said valve spool, and means for introducing fluid under pressure to said operating cylinders for changing the position of said valve spool between its two operating positions.

6. A control valve comprising an outer body member, an open ended cylinder supported within said body member in spaced relation thereto, crosswise flanges dividing the space between said cylinder and said body member into three intermediate and two end chambers, said body member having an exhaust port communicating with each of said end chambers, an inlet port communicating with the central intermediate chamber, and operating ports communicating with the two other intermediate chambers, said cylinder having ports, one of which communicates with each of said three intermediate chambers, a tubular valve spool slidably mounted in said cylinder and having an end land adjacent each end, two intermediate lands and a port situated between said intermediate lands, said valve spool having two operating positions in which said inlet port is communicated selectively with either of said operating ports and the other operating port is communicated with said exhaust port, and a neutral position in which said inlet port is communicated with said exhaust port and said operating ports are closed, operating cylinders mounted on the ends of said body member, reciprocable operating pistons in said operating cylinders, piston rods for transmitting motion of said operating pistons to said valve spool, and means for introducing fluid under pressure to said operating cylinders for changing the position of said valve spool between its two operating positions and its neutral position.

7. A control valve comprising an outer body member, an open ended cylinder supported within said body member in spaced relation thereto, crosswise flanges dividing the space between said cylinder and said body member into three intermediate and two end chambers, said body member having an exhaust port communicating with each of said end chambers, an inlet port communicating with the central intermediate chamber, and operating ports communicating with the two other intermediate chambers, said cylinder having ports, one of which communicates with each of said three intermediate chambers, a tubular valve spool slidably mounted in said cylinder and having external lands which engage the cylinder walls and at least one port, said valve spool having two operating positions in which said lands are situated to communicate the cylinder port in the central intermediate chamber selectively with the cylinder port in either of the two other intermediate chambers and thereby communicate said inlet port with either of said operating ports and to communicate the cylinder port in the third intermediate chamber with the port in said valve spool and thereby communicate the other operating port with said exhaust port, operating cylinders mounted on the ends of said body member, reciprocable operating pistons in said operating cylinders, piston rods for transmitting motion of said operating pistons to said valve spool, and means for introducing fluid under pressure to said operating cylinders for changing the position of said valve spool between its two operating positions.

8. A control valve comprising an outer body member, an open ended cylinder supported within said body member in spaced relation thereto, crosswise flanges dividing the space between said cylinder and said body member into three intermediate and two end chambers, said body member having an exhaust port communicating with each of said end chambers, an inlet port communicating with the central intermediate chamber, and operating ports communicating with the two other intermediate chambers, said cylinder having ports, one of which communicates with each of said three intermediate chambers, a tubular valve spool slidably mounted in said cylinder and having external lands which engage the cylinder walls and at least one port, said valve spool having two operating positions in which said lands are situated to communicate the cylinder port in the central intermediate chamber selectively with the cylinder port in either of the two other intermediate chambers and thereby communicate said inlet port with either of said operating ports and to communicate the cylinder port in the third intermediate chamber with the port in said valve spool and thereby to communicate the other operating port with said exhaust port, said valve spool also having a neutral position in which said lands are situated to communicate the cylinder port in the central intermediate chamber with the port in said valve spool and thereby communicate said inlet port with said exhaust port and to close the cylinder ports in the other two intermediate chambers, and means for moving said valve spool between its two operating positions and its neutral position.

9. A control valve comprising an outer body member, an open ended cylinder supported within said body member in spaced relation thereto, crosswise flanges dividing the space between said cylinder and said body member into three intermediate and two end chambers, said body member having an exhaust port communicating with each of said end chambers, an inlet port communicating with the central intermediate chamber, and operating ports communicating with the two other intermediate chambers, said cylinder having ports, one of which communicates with each of said three intermediate chambers, a tubular valve spool slidably mounted in said cylinder and having external lands which engage the cylinder walls and at least one port, said valve spool having two operating positions in which said lands are situated to communicate the cylinder port in the central intermediate chamber selectively with the cylinder port in either of the two other intermediate chambers and thereby communicate said inlet port with either of said operating ports and to communicate the cylinder port in the third intermediate chamber with the port in said valve spool and thereby to communicate the other operating port with said exhaust port, said valve spool also having a neutral position in which said lands are situated to communicate the cylinder port in the central intermediate chamber with the port in said valve spool and thereby communicate said inlet port with said exhaust port and to close the cylinder ports in the other two intermediate chambers, means for moving said valve spool between its two operating positions and its neutral position, and time delay mechanism for regulating movement of said valve spool so it pauses for a predetermined interval in its neutral position when it moves from one operating position to the other.

10. The combination with a four-way valve which includes a body having ports adapted to admit and discharge fluid and a slide reciprocable in said body for interconnecting said ports and having two operating positions and a neutral position intermediate its operating positions, of an operating mechanism comprising a pair of operating cylinders fixed to opposite ends of said valve body and each containing an operating piston, a piston rod connecting its operating piston with the adjacent end of said slide, a sleeve-type piston surrounding its piston rod and mechanically connected therewith so that movement of its sleeve-type piston toward said valve body moves said slide from an operating position to said neutral position, and a stop limiting movement of its sleeve-type piston toward said valve body, conduits connected to said operating cylinders behind said operating pistons for applying fluid pressure to or relieving the spaces behind these pistons, conduits connected to said operating cylinders between said operating pistons and said sleeve-type pistons for applying fluid pressure to or relieving the spaces therebetween, a dwell cylinder, a dwell piston reciprocable in said dwell cylinder, and conduits connecting said dwell cylinder and said operating cylinders, said sleeve-type pistons establishing communication between said second and third named conduits when moved against said stops for moving said dwell piston but otherwise preventing such communication, said dwell cylinder and piston controlling admission of fluid to said first named conduits, whereby said valve slide in shifting from one operating position to the other remains in its neutral position while said dwell piston completes its movement.

PAUL E. NOLL.
CHARLES W. CRAWFORD.
T. DWIGHT ALLER.
ALBERT R. RETHEY.

REFERENCES CITED

The following references are of record in the file of this patent:

UNITED STATES PATENTS

| Number | Name | Date |
|---|---|---|
| 2,365,536 | Fischer et al. | Dec. 19, 1944 |